July 17, 1956 — C. C. TOIL — 2,754,615

FISHING LINE CONNECTOR

Filed Dec. 23, 1952

INVENTOR.
Charles C. Toil
BY Robb & Robb
His Attorneys

United States Patent Office 2,754,615
Patented July 17, 1956

2,754,615

FISHING LINE CONNECTOR

Charles C. Toil, Fort Pierce, Fla.

Application December 23, 1952, Serial No. 327,472

1 Claim. (Cl. 43—44.83)

My present invention pertains to the art of fishing and involves primarily a novel form of connector by which a fishing line may be attached to a hook directly by the use of the connector, or by which the line may be secured to any one of many types of lures forming artificial bait, and such as commonly in use today.

The fishing line connector of my invention is particularly advantageous for use in fishing for large fish, as for example in deep sea fishing, under which conditions likelihood of breaking of the fishing line itself arises.

It is almost universal today for fishermen to attach a fishing line to a hook directly, by a swivel type detachable connector, or to a hook leader, or the like, by passing the line at an end thereof through a loop member of some sort, and tying a knot in the line thereafter for completing the attachment of the line to the hook, lure or whatever other part is to be secured thereto.

As a result of many years of experience in fishing, for larger fish, I have found that where the fishing line is tied to the hook, a leader, a lure or the like by the knotting method above referred to, when excessive strain is put upon the line by a caught fish, almost invariably the line will be parted by breakage at the knitted portion. The reason for the foregoing is not altogether clear, but I believe the breakage at the knot portion is due to the fact that when the line is tied to the hook or equivalent part, according to the method above referred to, the actual tightening of the portion of the line where the knot is formed, causes a weakening of the line at such portion and thus creates the liability of breakage there on the general principle that the line is only as strong as its weakest portion. In my experience in fishing, on many occasions I have found that a fishing line that is guaranteed to resist a pull up to say 20 pounds, will break under a tension considerably less than 20 pounds, primarily and substantially invariably at the knotted portion where the line is connected to the hook or lure, or bait holding member.

The same is true in respect to lines guaranteed to resist breakage up to pulls of 15 pounds or exceeding 20 pounds, as examples.

With the foregoing experience in mind, I have devised the novel connector means of my present invention, which comprises a connector member including a suitable shank portion made from spring or like wire, at one end of which shank portion there is provided a loop, or detachable catch member, or the like, for attachment to a hook, lure or other bait, the other end of the said shank member being formed preferably into a loop and thereafter wound spirally about the main body of the shank member, to provide a plurality of spiral portions. After formation of the spirally wound portions just referred to, the wire of the connector may be suitably anchored some distance from the last mentioned loop as by tightening the wire around the shank.

The spirals of the spirally wound portion on the shank of the connector, as above described, are intentionally slightly spaced apart, so that when the fishing line is combined with the connector, said line may be passed at its bait connecting end, through the loop at the end of the spirally wound portion, and thence wound around and in contact with the shank so as to follow below or at one side of and in contact with the spirally wound section of the connector. Thereafter the extremity of the line may be caused to encircle the shank below or at the outer side of the end anchorage portion of the spiral winding section aforesaid, and tied to the shank at such portion by any suitable knot. Thus it is that in my mode of combining the fishing line and connector of my invention, the strain which is placed on the line, as when a fish is caught, is distributed against the sides of the spirally wound section on the connector, by reason of the spiral winding of the line in adjacency to the spirals of said section, and such strain is not directly communicated to or sustained by the knotted portion of the line where the extremity of the latter is anchored to the shank.

I have found in practice that when a connector of the construction above set forth is used, and the fishing line combined therewith in the manner described, in actual use the full strength of the line insofar as the guaranteed resistance to a pull of a predetermined number of pounds is concerned, may be availed of, and the line will be less likely to break at the point of its knotted connection to the connector, but will substantially invariably or always break at some point between the connector and the manually held or controlled end of the line, and only when the pull on the line reaches a point substantially above the guaranteed resistance limit to breakage.

For a full understanding of my invention, reference is to be had to the accompanying drawings illustrating certain embodiments thereof, and in the said drawings.

Figure 1:
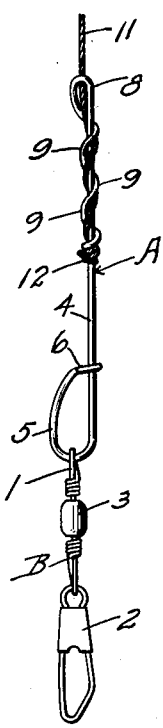
Figure 1 is a view in elevation of a connector of my invention combined with a fishing line attached thereto, in accordance with the invention, the connector in this instance including a detaching and attaching loop member from which a swivel hook fastening of common type used in fishing is carried.
Figure 2:
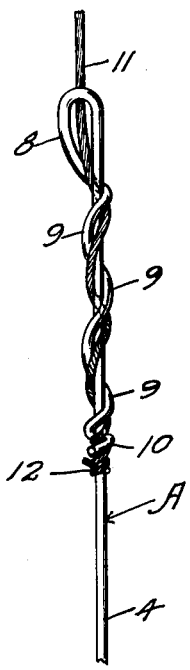
Figure 2 is an enlarged view showing more particularly the peculiar novel form of the connector member of my invention, as respects particularly the shank part thereof, and also illustrating the fishing line combined with the connector in accordance with the invention.

Referring now to Figure 1 of the drawings, and describing the detailed construction of my invention, the letter A generally denotes my novel connector and the letter B generally denotes a common form of swivel connector or fastener by which a hook, lure or other artificial or live bait may be attached to my connector A. The fastener B has a loop 1, at its upper end, a detachable hook 2 at its lower end, and a swivel connection 3 connecting the parts 1 and 2 together.

Referring now to the construction of my connector A, it is noted that the same comprises primarily the main shank portion 4, the lower end of which is provided with a loop portion 5, the extremity of the preferably spring wire from which the connector is made, adjacent the loop portion 5, being formed into a catch 6 for detachable engagement with the lower end portion of the shank 4. The parts 5 and 6 may be employed if desired, simply for the purpose of providing quick detachable connecting means for the connector A, by which to secure thereto a fastener such as B, or a gut leader such as designated 7 in Figure 3, or artificial baits such as ordinary plugs used in fishing as will be evident to any fisherman.

Now as seen in Figure 1, the upper end of the shank 4 of my connector A is rebent upon itself to provide a small loop portion 8, and after the forming of the loop, the wire from which the shank is made is coiled or wound spirally around the shank in contact therewith as it leads downwardly from the loop 8 to form a plurality of relatively long spirals 9 after which the extremity of such spirally wound portion is bent directly around the shank transversely thereof and preferably such as shown at 10, anchoring such portion to the shank at the point where the loop is made.

In order that my connector A may be of ample strength, I preferably utilize spring wire in the formation of the parts thereof.

With the above construction of the connector A in mind, and particularly in reference to the formation of the shank 4 with the spirally wound section including the spirals 9 thereof, it will be seen that my method of uniting the fishing line designated 11 with the connector, is as follows:

The line 11 is first passed through the guiding loop 8 at the upper end of the connector A after which the line is wound spirally alongside the spiral portions 9 of the connector following the spiral formations thereof, until the line reaches a point below the loop 10, at the lower terminal of the spirally wound portion of the shank. At this point, and below the loop 10, the fishing line may be tied into a knot such as formed at 12 according to Figure 1, and thus finally anchored to the shank of the connector; but leading from the point of anchorage upward or longitudinally along the shank 4 following the spiral winding of the spiral portion 9 as above described.

The advantage of utilizing the connector A and fishing line connected together in the manner above set forth has been indicated hereinbefore, and it will be seen that when strain is put upon the line 11, since the line is virtually snubbed around the shank 4 in bearing contact with the spaced spiral sections 9 of said shank, the strain on the line 11 will be distributed over a considerable portion of the shank at the spiral sections 9 with bearing of the spirally wound portion of the line against the spirally wound portion on the shank of the connector.

The foregoing described construction of my connector and mode of providing therewith the fishing line, has been found to be very effective to enable the line to be used well up to and even slightly beyond its predetermined or calculated point of resistance to breakage, and the stress or strain on the line is not communicated to the same at the point of the knot 12 where the greatest likelihood of breakage would occur in the absence of the provisions of the coiled or spirally wound sections 9 of the shank 4.

Figure 3:
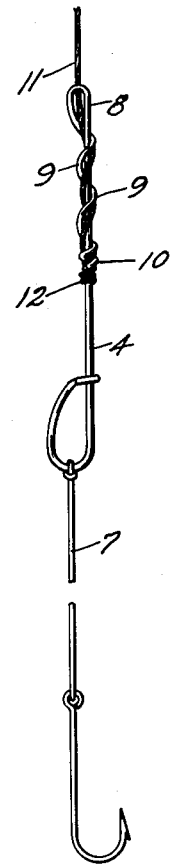
Figure 3 is a view somewhat similar to Figure 1, but illustrating the connector as when it may be attached to an ordinary fishing hook having a gut leader, detachably connected to the lower end of the connector.

As indicated before, the illustration of Figure 3 of my drawings, is merely to exemplify a different method of attaching a hook or any kind of bait to the lower or detachable loop end of my connector.

Figure 4:
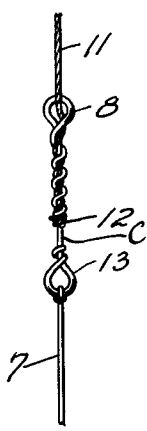
Figure 4, is a view, showing a modified form of the connector wherein a guide loop leading to the spirally wound portion or section on the shank is employed, and an attaching loop for permanent connection of a lure is provided in lieu of a readily detachable loop portion as employed in the constructions of Figures 1 and 3.

In Figure 4, the connector shown is designated at C and involves a formation substantially like that illustrated in Figure 1, except the lower end of the shank is formed into a permanent small loop 13 with which may be connected hooks or bait or artificial lures after any of the ordinary methods conventional and known to fishermen. The mode of attachment of the fishing line to the connector C in Figure 4 is identically the same as in respect to the construction of Figure 1.

The spiral sections 9 of the spirally wound portion on the shank 4, constitute spiral abutment portions on the shank leading from the line inter-engaging loop 8 toward the middle of the shank 4.

The anchorage part 10 of the spiral abutments on the shank forms a sort of stop where the line knot 12 is located, to prevent sliding of the knot portion along the shank 4, when pull is exerted on the line 11, as when a fish is caught.

Having thus described my invention, what I claim as new and desire to secure by Letters Patents of the United States, is:

A fishing line connector comprising a straight shank of small diameter, one end of said shank being formed into a portion for engaging a hook, lure, or the like, said shank having a band therein intermediate its ends to form a loop, the free end of said shank adjacent the loop being bent back along the shank from the loop and wound in a spiral manner about the straight shank a plurality of times in close contact therewith to provide a continuous spiral shoulder against which a fish line may lie with the tip end of said spirally wound portion closely coiled about the shank to provide a transverse line knot stop against which a knotted portion of a fishing line may abut.

References Cited in the file of this patent

UNITED STATES PATENTS

| | | |
|---|---|---|
| D. 33,775 | Bower | Dec. 25, 1900 |
| 54,684 | Chapman | May 15, 1866 |
| 103,645 | Muscroft | May 31, 1870 |
| 1,004,198 | Rabbeth | Sept. 26, 1911 |
| 2,592,664 | DeMello | Apr. 15, 1952 |

FOREIGN PATENTS

| | | |
|---|---|---|
| 65,439 | Norway | Nov. 2, 1942 |